United States Patent
Kosloski et al.

(10) Patent No.: US 10,108,940 B2
(45) Date of Patent: Oct. 23, 2018

(54) SYSTEMS AND METHODS FOR UTILIZING SOCIAL MEDIA WITH MONEY TRANSFER TRANSACTIONS

(71) Applicant: Moneygram International, Inc., Minneapolis, MN (US)

(72) Inventors: Joel Kosloski, Grand Prairie, TX (US); Thadd Rae Tokerud, Dallas, TX (US); Khaled Adel Sioufi, McKinney, TX (US); Chelsea Adina Lish, Dallas, TX (US); Brinkley Brown Eiting, Dallas, TX (US); Eric M. Garza, Dallas, TX (US); Sarah Elizabeth Bradbury, Dallas, TX (US)

(73) Assignee: Moneygram International, Inc., Minneapolis, MN (US)

(*) Notice: Subject to any disclaimer, the term of this patent is extended or adjusted under 35 U.S.C. 154(b) by 221 days.

(21) Appl. No.: 14/225,307

(22) Filed: Mar. 25, 2014

(65) Prior Publication Data
US 2015/0278775 A1    Oct. 1, 2015

(51) Int. Cl.
*G06Q 20/10* (2012.01)
*G06Q 50/00* (2012.01)

(52) U.S. Cl.
CPC ............ *G06Q 20/10* (2013.01); *G06Q 50/01* (2013.01)

(58) Field of Classification Search
CPC ..................................................... G06Q 20/10
USPC ..................................................... 705/35–45
See application file for complete search history.

(56) References Cited

U.S. PATENT DOCUMENTS

| | | | | |
|---|---|---|---|---|
| 8,326,770 | B1* | 12/2012 | Weisman | G06Q 30/04 705/319 |
| 2008/0104679 | A1* | 5/2008 | Craig | H04L 67/306 726/4 |
| 2008/0189122 | A1* | 8/2008 | Coletrane | G06Q 50/01 705/319 |
| 2012/0185383 | A1* | 7/2012 | Demark | G06Q 20/102 705/40 |
| 2013/0132294 | A1* | 5/2013 | Schvey | G06Q 30/0207 705/319 |
| 2013/0282455 | A1* | 10/2013 | Houseworth | G06Q 30/0214 705/14.16 |
| 2014/0136352 | A1* | 5/2014 | Ramakrishna | G06Q 20/12 705/21 |
| 2014/0379580 | A1* | 12/2014 | Varma | G06Q 30/06 705/44 |

* cited by examiner

*Primary Examiner* — Chia-Yi Liu
(74) *Attorney, Agent, or Firm* — Norton Rose Fulbright US LLP

(57) ABSTRACT

Systems and methods which utilize one or more social networking systems when creating, funding, and/or notifying a party of a transaction are provided. In accordance with one aspect, a money transfer transaction may be staged by a user whereupon a link corresponding to the staged transaction may be posted to one or more social networking services in order to allow for multiple users to access and fund the staged transaction. Additionally, in some aspects a user of a social networking service may generate a comment or post which then automatically triggers the staging of a money transfer transaction. Moreover, social networking services may be utilized to provide various notifications regarding money transfer transactions.

16 Claims, 4 Drawing Sheets

SYSTEMS AND METHODS FOR UTILIZING SOCIAL MEDIA WITH MONEY TRANSFER TRANSACTIONS

TECHNICAL FIELD

The present application relates to money transfer transactions, and more specifically to systems and methods for utilizing social media in money transfer transactions.

BACKGROUND

Generally speaking, money transfers are real-time transactions in that a transaction begins when a sender initiates the transaction at the time the money is to be sent to a receiving party. For example, a money transfer may be utilized in an emergency setting such as when a receiving party has an immediate need for funds. In such a transaction, a sender initiates a money transfer transaction with a money transfer service, such as with a local agent located within a MoneyGram® location. When the transaction information is gathered and the structure of the transaction is finalized, the sender provides the funds to a money transfer agent at or before the time that the funds of the transaction are actually transferred.

Once the funds are received at the time of the transaction, the agent may then provide a transaction code or some other form of transaction identifier to the sender. The sender will then provide the transaction code or identifier to the receiver. With this code the receiver may enter an agent location and complete the transaction and receive the transferred funds.

As can be seen, money transfer transactions typically only involve a sending party, receiving party, and intermediary money transfer service. This has been historically true due to the nature of customer needs (e.g. privacy concerns, the need to utilize cash, etc.) and the need to control for transaction security (e.g. to provide more certain authentication in order to mitigate fraud). As personal electronic devices have become more prevalent, portions of money transfer transactions have become more automated. However, such automated portions of transactions often still tightly control where transaction information is received and sent, thereby maintaining the primary contact between the sender/receiver and money transfer service. For example, a single sending party may utilize a device to provide transaction information to a money transfer service entity via a web portal or application administered by the money transfer entity, whereupon the money transfer service entity will stage/execute the transaction and possibly notify the receiving party at the receiving party's electronic device.

BRIEF SUMMARY

The present application provides for systems and methods which utilize one or more social networking systems when creating, funding, and/or notifying a party of a transaction. In one aspect, systems and methods for facilitating a money transfer transaction may include establishing a relationship between a user and a money transfer service. With this relationship, the one or more social networking accounts of said user may be associated with activities implemented by the money transfer service. Further, one or more notifications may be provided to a social media server by a money transfer service which correspond to the user's activities undertaken with the money transfer service.

In accordance with one aspect, a money transfer transaction may be staged by a user whereupon a link corresponding to the staged transaction may be posted to one or more social networking services. When a contact of a user of a social networking service selects the link, a window may be provided which allows the contact view the transaction and fund some or all of the money transfer transaction. Additional contacts may also fund the same transaction by selecting the link. It is appreciated that contact may be directed to the staged transaction from a single or multiple social networking services. Once the transaction is funded, a receiving party (which may be the initial user) may collect the funds from the money transfer service.

In accordance with another embodiment, a user of a social networking service may create a comment or post which then automatically triggers the staging of a money transfer transaction. For example, a user may post in a social networking setting that funds will be transferred, and a transaction may be automatically created where that user is a sending party and may access the created transaction to finalize the transaction with the money transfer service.

In accordance with another embodiment, social networking services may be utilized to provide various notifications regarding money transfer transactions. For example, a sending party may implement a transaction schema where access to a sending party's social network profile information may be granted which allows for transaction notifications to be sent to the sending party. Alternatively, a receiving party may be notified of a money transfer transaction via social media. Such a receiving party may be accessed by the money transfer service via a contact relationship with a sending party or by other means such as a pre-existing relationship with the money transfer service.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
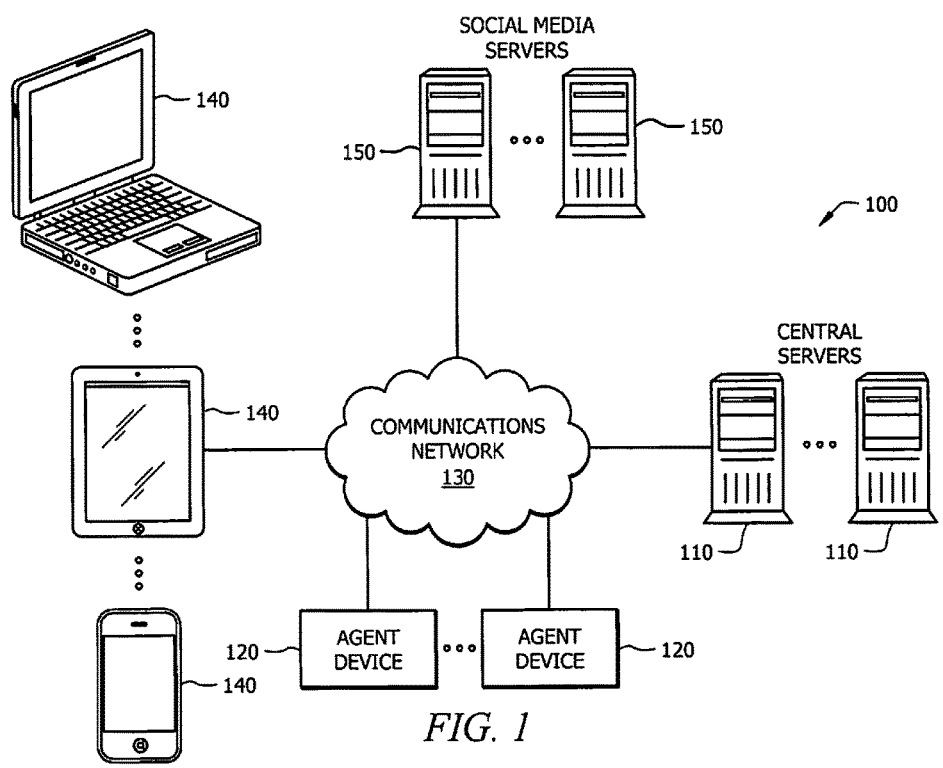
FIG. 1 illustrates a financial transaction computing network in accordance with an embodiment of the present application.

FIG. 1 illustrates a financial transaction computing network 100 in accordance with an embodiment of the present application. Financial transaction computing network 100 may include one or more central servers 110. Central servers 110 correspond to a central or parent entity which administers money transfer transactions between agent devices 120. Central servers 110 may be commonly located or distributed geographically. Additionally, the administration of a money transfer transaction and/or the configuration of one or more agent devices 120 may be implemented by a single server, or by using multiple processing resources of a plurality of servers.

Financial transaction computing network 100 further includes a communication network 130. Communication network 130 may include any type of network which allows for communication between central servers 110, agent devices 120, user devices 130 and social media servers 150. For example, communication network 130 may comprise the Internet, WiFi, mobile communications networks such as GSM, CDMA, 3G/4G, WiMax, LTE, and the like. Further, communications network 130 may comprise a combination of network types working collectively.

Agent devices 120 correspond to one or more computing devices which may be disposed at an agent location of a money transfer service or distributed geographically within the network. Such computing devices are configured with sufficient processing resources, memory, communications capabilities, and the like, to implement the functionality described herein. It is noted that in some embodiments an agent may have multiple devices at a particular location. Further, while only a small number of agent devices 120 are shown for the sake of simplicity, it is contemplated that financial transaction computing network 100 may include a very large number of agent devices 120 which are located worldwide. In some instances, multiple agent devices 120 may correspond to a particular chain of locations owned by an agent, while in other instances, an agent may have only a single location. Further, agent devices 120 may include distributed stand-alone kiosks.

In some instances, particular groupings of agent devices 120 may be administered to by a pre-determined central server 110. Such a relationship may be established based on physical proximity of the devices and/or based on capabilities of the devices, e.g. processing resources, bandwidth availability, and the like. In other instances, agent devices 120 may be administered to by a central server 110 based on other considerations, such as communication availability, processing resources, etc.

Central server 110 may be configured to implement and/or assist with one or more aspects of a money transfer transaction. For example, central server 110 may cooperate with agent devices 120 in establishing user accounts, user profiles, staging transactions, and the like. Likewise, central server 110 may cooperate with user devices 140. For example, one or more user devices may include a dedicated app or access a web-based program that is implemented by central server 110 to facilitate functionality disclosed herein. Further, central server 110 may communicate with one or more social media servers to send/receive information, monitor social media activity, etc.

Network 100 may also include one or more user devices 140. User devices 140 may be any type of device which would facilitate the exchange of information within system 100. For example, user devices 140 may include computer systems, tablet devices, mobile telephones, and the like. Different embodiments may utilize different aspects of the types of client devices. For example, mobile telephones and tablet devices may have the ability to connect with various communications networks and may have different application execution capabilities. User devices 140 may be utilized before, during and after a money transfer transaction in any manner to facilitate convenient and secure transactions.

Further, user devices 140 may be configured to utilize social networking sites which are administered by one or more of social media servers 150. In accordance with some embodiments, user devices 140, social media servers 150, central servers 110 and/or agent devices 120 may cooperate to implement one or more aspects of a money transfer transaction which utilize features of one or more social media applications to provide for various advantages.

Social media server 150 may be one or more servers corresponding to a different social media programs such as Facebook®, Instagram®, Twitter®, Google+®, etc. Such servers may send and receive data with one or more connected devices such as user devices 140, central servers 110 and agent devices 120. Further, central servers 110 may be provided access to one or more portions of data regarding a user of a social networking program by the social media servers 150, or by the users themselves. Social media servers 150 may also allow for various monitoring of social media activity by central servers 110 in some instances to facilitate money transfer transactions.

The following discussion provides example transaction flows and features which utilize social media services within a money transfer network. It is appreciated that the following example cases may be implemented separately, or in combination with one another. Such examples may be implemented in a transaction network, such as network 100, or any other suitable network.

Figure 2:
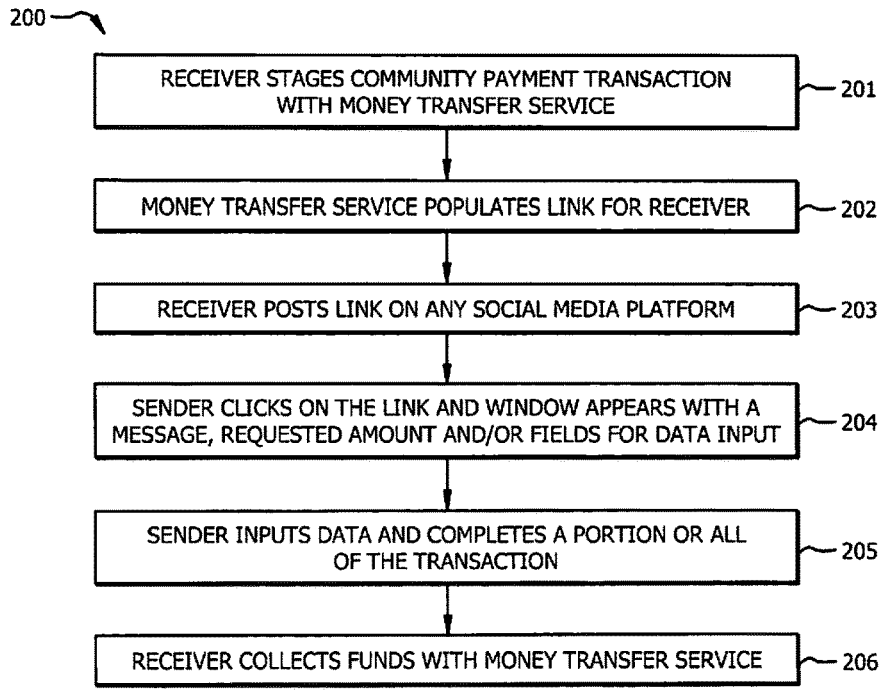
FIG. 2 illustrates a community payment transaction flow in accordance with an embodiment of the present application.

FIG. 2 illustrates a community payment transaction flow 200 in accordance with an embodiment of the present application. A community payment transaction may be characterized in that multiple payees of a money transfer transaction may provide funds while accessing the transaction via a social network posting. In the example transaction flow 200, a receiving party may stage the community payment transaction at 201. Such staging may be implemented using, e.g., user device 140 or at an agent location using agent device 120. To stage a transaction, a receiving party may provide details regarding the transaction such as an amount requested, a destination party (whether the party is the receiving party or another third party), etc.

It is noted that the receiving party that stages the transaction may be an individual who is requesting funds from social media contacts or a third party billing service that is establishing a transaction in order to receive payment for a bill/debt. For example, an individual may be requesting funds for any reason from social media contacts. Alternately, a party that the individual wishes to provide payment to may stage the transaction on the individual's behalf and provide the staged transaction details to the individual or may post the transaction to the individual's social network stream.

At step 202, the money transfer service may populate/provide a link or similar indicator that a receiving party may post to one or more social network streams at 203. Such a link may be created by one or more central servers 110, or by other devices within network 100. The link may also provide further indication or details regarding the request for funds, the requester, and the like. The provided link may be formatted in a manner that it is agnostic to any particular social media platform. Accordingly, the receiving party may post the link to multiple social media sites. It is further appreciated that in some aspects, the money transfer service may be given access to one or more of the receiving party's social media accounts and post the link in the receiving party's social media stream such that it is viewable by the receiving party's contacts.

Upon seeing a link in a social media network stream, a sending party may select the link and be guided to a page in a new window and/or an applet belonging to the money transfer service at 204. Such a window or applet may be administered by central servers 110 or by programs provided by a money transfer service to social media severs 150. Upon selecting the link or opening the window a potential sending party may view one or more details regarding the transaction such as the purpose of the transaction, the destination, the receiving party, and the like. The sending party may then provide the required inputs to complete the send transaction at 205.

In some instances, a sending party may provide less than the total amount requested to fund the money transfer transaction. In such instances, a plurality of sending parties which are associated with the party posting the transaction request may access the transaction link and fund a portion of the transaction. Further, in some instances, contacts of the receiving party may forward or re-post the link to their contacts in order to provide for wider distribution of the funding request, whereupon these contacts may provide funds. It is appreciated that this forwarding may proceed accordingly with $2^{nd}$ to $n^{th}$ degree contacts within the social media network.

Once the transaction is funded, the receiving party may collect the funds at 206. Such collection may be implemented at a money transfer agent location, or via an electronic means. For example, a receiving party may provide identification at a money transfer service agent location and then receive the transferred funds. In other instances, electronic delivery is provided. It is further appreciated that in the instance where a billing party is to be the receiver of the funds, such funds would likely be electronically transferred to the billing party.

In some embodiments, a receiving party may only receive a partial payment of the requested amount of funds. Such partial payments may be provided to the receiving party, or may be refunded to the one or more sending parties depending on the preferences established in the staged transaction. It is further appreciated that the money transfer service may collect a money transfer fee corresponding to the full amount of the transfer (such as a pre-defined dollar amount or percentage). In the event that only partial funds have been received, the money transfer service may select to receive less than the dollar amount. For example, a fee table or percentage basis may be established which defines money transfer transaction fees based on different transferred amounts.

Further, in some embodiments, time limits on community pay transaction may be imposed. For example, a receiving party staging the transaction or the money transfer service may define a pre-determined period of time whereupon the transaction must be completed, paid out, or refunded. Such a definition may be implemented in any manner based on the preferences of the parties. For example, if a transaction is being staged by a billing party or a party attempting to send payments to a biller, a time limit may be imposed which corresponds to a bill deadline. After the time limits are exceeded, the provided link may expire or corresponding windows that are opened to a sending party may become non-functional.

Figure 3:
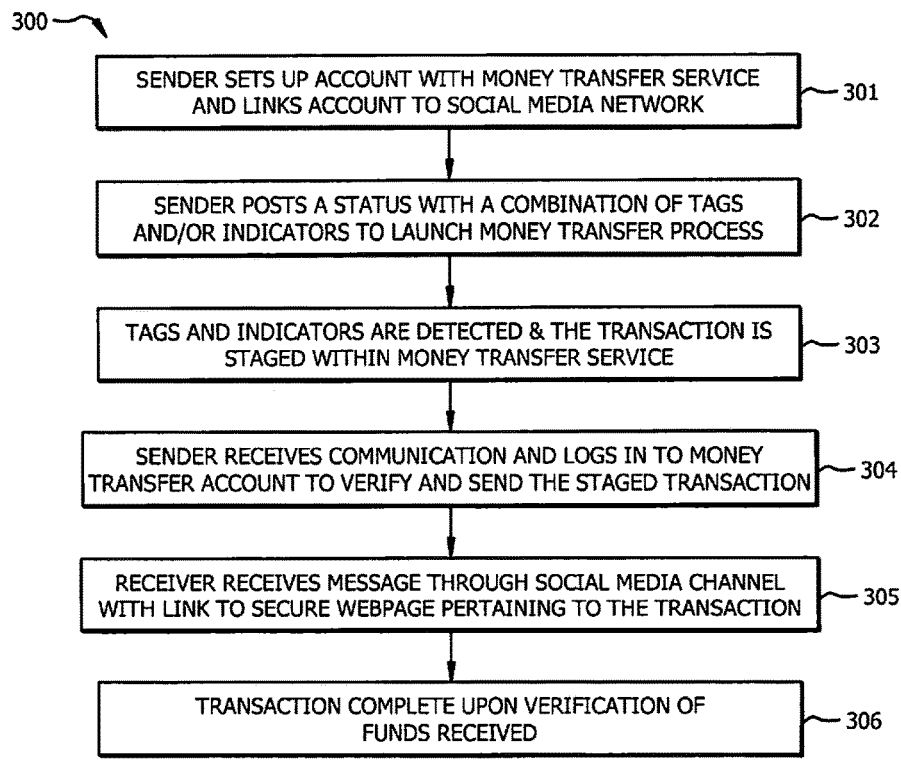
FIG. 3 illustrates a social media based pre-staged transaction flow in accordance with an embodiment of the present application.

FIG. 3 illustrates a social media based pre-staged transaction flow 300 in accordance with an embodiment of the present application. Such a social media based money transfer transaction may be caused to be staged based on activity of a sending party during a social media interaction. For example, a sending party may send a message or post a message directed to a receiving party which indicates that a money transfer will be sent. In posting this message, the sending party may utilize various tags or indicators that may be monitored by a money transfer service in order to initiate the transaction. For example, in a Twitter setting, a party may post "@receiving party, a money transfer for XYZ is being sent. #moneygram #10 dollars." The hash tags may be monitored by the money transfer service (e.g. via central server 110) and may cause the money transfer service to stage a transaction from the sending party to the receiving party for the specified amount. It is appreciated that various tags and indicators may be utilized according to what is used in a particular social media setting and what may be monitored by the money transfer service.

The illustrated embodiment of pre-staged transaction flow 300 may begin at step 301 where a sender may set up an account with a money transfer service. The account may be linked to one or more social media accounts for the sender so that the money transfer service has access to data posted by the sender, or may be notified to watch for public messages from the sender. It is appreciated that depending on the particular social media services being utilized, different tags and indicators may trigger staging of transactions.

As step 302, a sender may post a status message that utilizes one or more tags or indicators that causes the money transfer service to launch a money transfer transaction staging process at 303. The indicators may provide various information to the money transfer service. For example, in some cases, the indicators may signal various transaction details such as parties to the transactions, dollar amounts, timing of the transfer, purpose of the transfer, etc. One or more of these indicators may be utilized to stage and verify the transaction. For example, the transaction purpose may provide information relevant to fraud prevention, whereas the amounts and parties provide specific details for the parameters of the transaction.

Additionally, as stated above, the money transfer service may become aware of the posted status message via a contact relationship with the sender, while monitoring public posts, etc. Further, one or more programs on a user device may monitor the usage of such tags/indicators and then send a notification to the money transfer service.

Once the transaction is staged, the money transfer service may send a communication to the sending party with a link or other information which allows the user to log onto the money transfer service and verify and fund the send transaction at 304. Such a link or other indication may be provided by any means such as in an email where a user may then link to the money transfer service's website. Alternatively, a sending party may utilize a dedicated smartphone application for the money transfer service and a notification may be sent through the application whereupon the sender may launch the application and complete the transaction.

After the sending portion of the transaction has been completed, the receiving party is notified of the transaction at 305. Such a notification may be provided through the same social media channel as the original message or privately. The notification may include a link to a pre-specified webpage where the receiving party may receive the necessary details to complete the transaction (e.g. to provide an identifying reference number). Further, within this webpage, various options may be provided to a receiving party for the pickup of funds. For example, a receiving party may be directed to a physical location for a money transfer service. Alternately, the receiving party may direct funds electronically to a bank account, PayPal® account, and the like.

Once the funds have been received by the receiving party, the transaction may be verified as being complete at 306. Such a verification may be sent to the sending party or may be posted via social media to advertise the fact that the sender completed a money transfer transaction via the money transfer service.

It is further appreciated that various devices in network 100 may be utilized in pre-staged transaction 300. For example, the sender may post the status message for the receiver, but then utilize an agent device 120 to look up the staged transaction and fund the transaction. Additionally, in the event that the receiving party has an account with the money transfer service or utilizes dedicated applications for the money transfer service, various notifications may be sent to the receiving party via the money transfer service concerning one or more of the original social media posting and/or the completed transaction. Within the framework of the receiving party's account, the receiving party may also direct the payment of funds, e.g. to be sent to an electronic account, to be picked up locally, etc.

Figure 4:
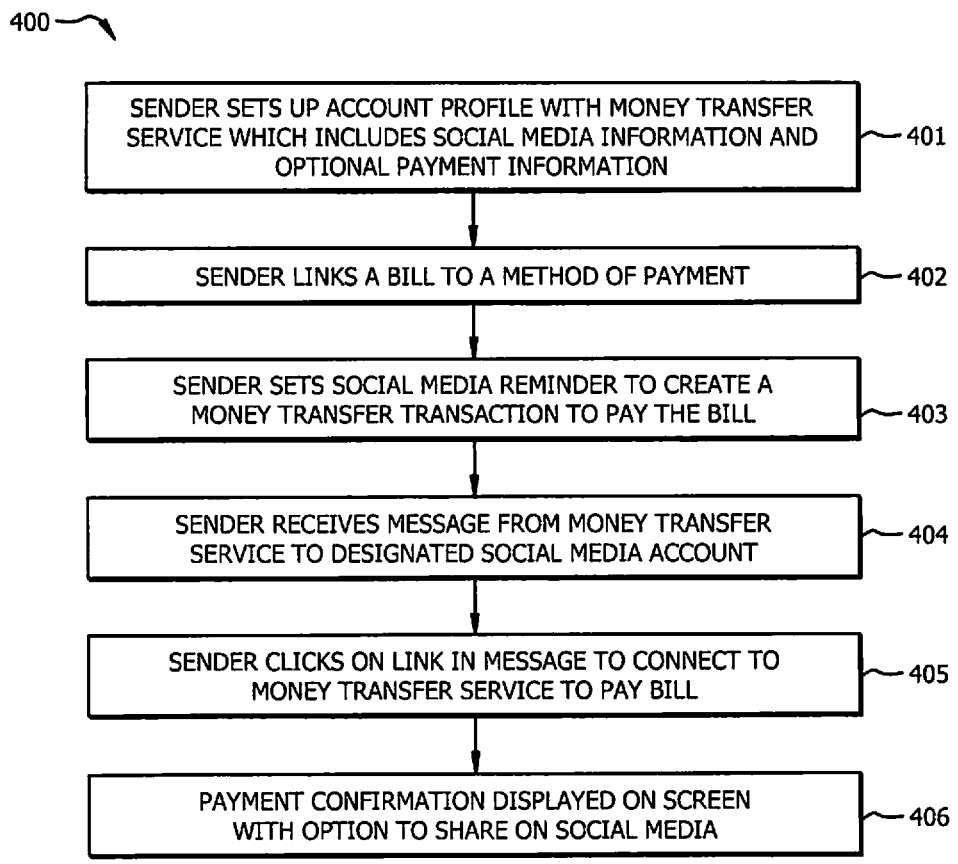
FIG. 4 illustrates a social media based payment reminder flow for a user of a money transfer service in accordance with an embodiment of the present application.

FIG. 4 illustrates a social media based payment reminder flow 400 for a user of a money transfer service in accordance with an embodiment of the present application. In this embodiment, a user may establish a criteria to receive reminders regarding funding of a money transfer transaction and/or a call to action to complete a staged transaction within a social media account.

At step 401 a user may set up an account profile with a money transfer service. The account profile may include social media information such as a username/address for one or more social network accounts of the user. It is appreciated that the linked social media accounts may be from any social media platform and in some cases multiple social media accounts may be sent reminders for a single transaction. Additionally, the user may set up payment information as part of the account profile that may be utilized to fund a money transfer transaction.

At step 402 a user may link a bill to a particular method of payment, such as a money transfer transaction. This linking may be done at the biller or within the profile of the user account with the money transfer service. With the bill linked to the account, the user may set a payment reminder for the bill at step 403. For example, the user may set a reminder for a money transfer payment to be implemented on the 15$^{th}$ of each month. It is appreciated that in embodiments where the bill is linked to a money-transfer type payment method, the biller may set the reminder and cause the user to receive a reminder via a social media platform. This linking may also be utilized in the community payment example discussed above.

At step 404 a reminder is sent from the money transfer service to one or more designated social media accounts. Such reminders may be provided under the control of central servers 110 to a social media server 150 for distribution to a user device. The reminder may include a link to a money transfer service program. In some cases, the link may direct the user to a pre-staged transaction for completion/payment of the designated bill. The user selects the link and is connected to the money transfer service at 405. To connect to the money transfer service, various user authentication methods may be utilized to ensure that fraudulent transfers are not sent. Once connected, the user may then fund the money transfer transaction and receive confirmation that the funds have been sent at 406. Further, in some embodiments a share option may be provided where the user may share a message on one or more of the associated social media services stating that a payment/money transfer transaction has been utilized via a money transfer service.

It is appreciated that the example flow of FIG. 4 is discussed in the context of a bill payment transaction, however, any reminders may be utilized. For example, a parent may set a reminder to transfer a child an amount of money at a particular time or on a periodic basis. Such reminders may come to the parent's social media account with the accompanying links to the money transfer service in order to implement the transaction. Additionally, in some aspects if a receiving party has also registered with the money transfer service, or is a contact within the sending party's social network, one or messages may be sent to the receiving party in order to notify them that the money transfer transaction has been established and that funds are ready for retrieval.

Figure 5:
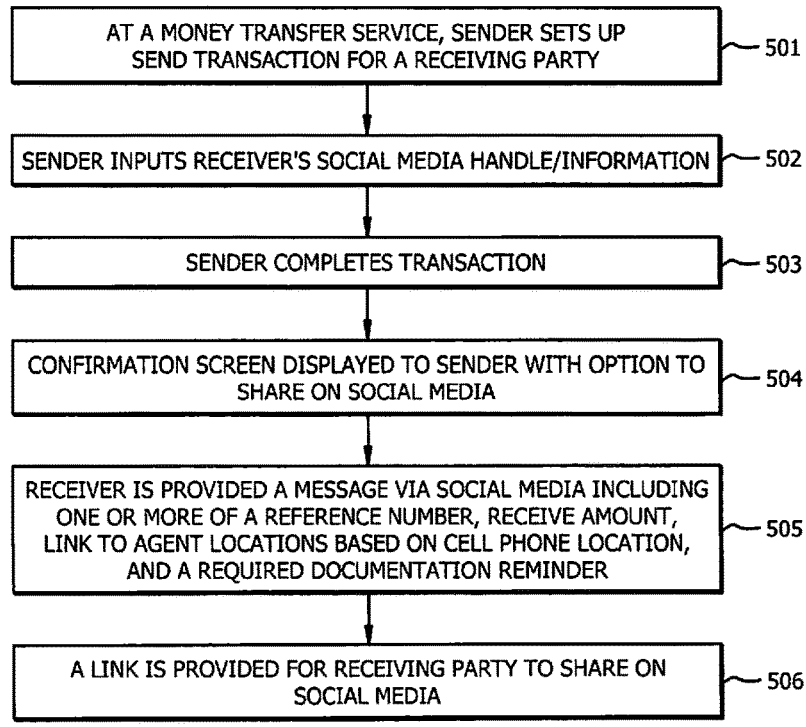
FIG. 5 illustrates an example receiver notification flow to allow a receiving party of a money transfer transaction to be notified of the transaction over social network media in accordance with an embodiment of the present application.

FIG. 5 illustrates an example receiver notification flow 500 to allow a receiving party of a money transfer transaction to be notified of the transaction over social network media in accordance with an embodiment of the present application. As with the above example embodiments, receiver notification flow 500 may be implemented within network 100. For example, a money transfer transaction may be established and funds may be transferred to a receiving party at 501. This transaction may be initiated within user device 140 and/or agent device 120 and implemented with the assistance of central server 110.

At step 502, a sending party may input a receiving party's social media handle. For example, the receiving party's social media user name, email address or other social media identification may be provided. After the transaction has been established and all of the details have been provided, the sender may complete the transaction at 503 and provide the funds for the money transfer transaction. Additionally, in some aspects the sender may be provided with an option to share the fact that a money transfer transaction has been sent on a social media account associated with the sender at 504.

At step 505, the receiving party receives a message via the provided social media program associated with the given handle. Such a message may include various details such as a reference number for a transaction, a receive mount, location information for an agent for the money transfer service, and a reminder regarding documentation that a receiving party may need to receive the funds. This message may be sent privately or posted publicly to the receiving party's social stream. It is appreciated that in the public posting scenarios, less information may be provided in the message so as to protect the privacy of the parties of the transaction. Further, one or more messages provided to the social media program may include one or more links to a money transfer service's website to enable the receiving party to accept the funds electronically or in another form such as a pre-paid credit card, gift card and the like.

Finally, at step 506, a link may be provided to the receiving party that may cause the receiving party to share via the social network that a money transfer transaction with a particular money transfer service has been utilized.

Figure 6:
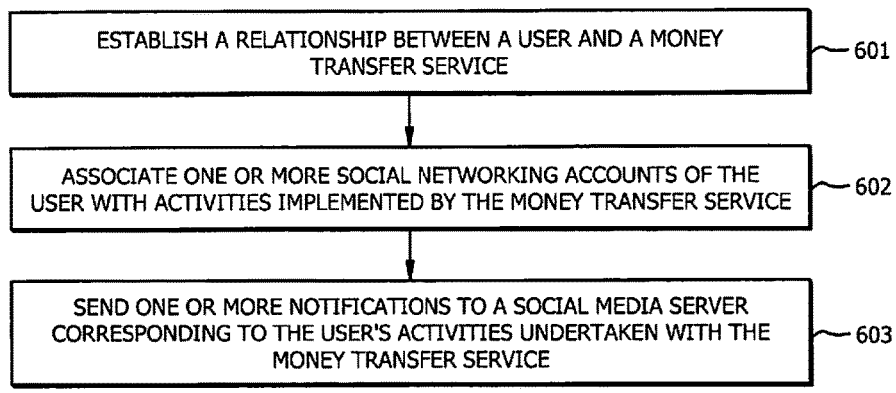
FIG. 6 illustrates a flow corresponding to a method for implementing a money transfer transaction while utilizing one or more social media platforms in accordance with an embodiment of the present application.

FIG. 6 illustrates a flow 600 corresponding to a method for implementing a money transfer transaction while utilizing one or more social media platforms in accordance with an embodiment of the present application. As with previous flows and transaction types, method 600 may be implemented utilizing one or more devices and processing resources of network 100.

Method 600 includes, at step 601, establishing a relationship between a user and a money transfer service. Such an establishment may comprise a user inputting profile data to a program administered by the money transfer service. Such profile information may include one or more of personal information, information regarding one or more social network accounts for the user or a receiving party of a transaction sent by the user, payment information, etc.

Method 600 also includes, at step 602, associating one or more social networking accounts of said user with activities implemented by the money transfer service. This association may be implemented as a result of user information provided while establishing the relationship with the money transfer service. Additionally, such association may include tying the user's account to one or more screen names of the user on a social network.

Further, method 600 includes at step 603 one or more notifications to a social media server corresponding to the user's activities undertaken with the money transfer service. Such notifications may be those as described above. For example, a notification may include a link to a process implemented by the money transfer service which allows a user to complete a transaction. Additionally, the link may posted to a receiving party's social network stream and a plurality of individuals may utilize the link to then fund a staged money transfer transaction. The process itself may be defined by a user and/or a billing party and the requested transaction may have one or more restrictions regarding deadlines for funding, amounts requested, and the like.

In some embodiments, the notification provided may include a reminder to send a money transfer and the link may correspond to a pre-established transaction that may be completed and funded upon navigating to the money transfer service. Such notifications may also be utilized to provide one or more details to a receiving party corresponding to a transaction that has been created and funded to provide funds to the receiving party.

Still further, in some embodiments, the notification may generated in response to a social media network user posting a message having one or more tags and indicators which automatically provide details to the money transfer service to stage a transaction. Such tags may include hashtag messages posted to a social media site which call out a money transfer service and provide one or more transaction details. The notification may include a link which allows a user to navigate to a process which allows for the completion/funding of the automatically staged transaction defined by the tagged messages.

It is appreciated that the above example cases may be implemented separately or in combination. For example, multiple methods for utilizing a social media platform as a part of a money transfer transaction may be utilized simultaneously. Additionally, it is noted that one or more steps in the example flow processes of FIGS. 2-6 may be implemented in a differing order or omitted all together.

It is noted that the functional blocks, modules and processes illustrated in FIGS. 1-6 may comprise or utilize processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for facilitating a money transfer transaction, said method comprising:
    establishing, by at least one processing device of a money transfer service, a relationship between a receiving party and a money transfer service, said establishing includes obtaining, by the at least one processing device of the money transfer service, account access of one or more social media account of the receiving party;
    associating, by the at least one processing device, the one or more social media account of the receiving party with activities implemented by the money transfer service, wherein said activities comprise:
        monitoring, by the at least one processing device, social media interactions of the receiving party, wherein the monitored social media interactions include one or more message posted on one or more social media stream of the one or more social media account of the receiving party;
        identifying, by the at least one processing device based on the monitored social media interactions of the receiving party, a transactional message from the one or more message posted on the one or more social media stream of the one or more social media account of the receiving party, wherein the transactional message includes transaction information descriptive of a new money transfer transaction;
        extracting, by the at least one processing device, the transaction information from the identified transactional message;
        staging, by the at least one processing device based on the extracted transaction information, the new money transfer transaction to transfer funds to the receiving party, wherein the staged money transfer transaction is configured to be paid out to the receiving party and funded by one or more sending party accessing the staged money transfer transaction and the money transfer service via the one or more social media stream;
    creating, by the at least one processing device, a webpage configured to provide access to the staged money transfer transaction;
    providing, by the at least one processing device, one or more notification to a social media server corresponding to the receiving party's activities undertaken with the money transfer service, wherein said providing the one or more notification comprises:
        determining, based on the money transfer service's access to the one or more social media account of the receiving party, if the one or more social media stream of the one or more social media account of the receiving party is public;
        posting, based on the determined public availability, a link corresponding to the created webpage configured to provide access to the staged money transfer transaction on the one or more social media stream of the one or more social media account of the receiving party, wherein the posted link is accessible to the one or more sending party; and
        directing, based on the posted link, the one or more sending party to the created webpage associated with the staged money transfer transaction, wherein the one or more sending party interacts with the webpage using a process implemented by the money transfer service to fund the staged money transfer transaction; and
    receiving, by the at least one processing device, funds from the one or more sending party corresponding to the staged money transfer transaction.

2. The method of claim 1 wherein the process implemented by the money transfer service allows for a predetermined maximum amount of funds to be provided by each of the one or more sending party.

3. The method of claim 1 wherein the process implemented by the money transfer service corresponds to funding the money transfer transaction that has been established by a billing party.

4. The method of claim 1 wherein the one or more notification provides one or more details to the receiving party corresponding to the staged money transfer transaction that has been created and funded to provide funds to the receiving party.

5. The method of claim 1 wherein the one or more notification is generated in response to a social media network user posting the transactional message, wherein the transactional message has one or more tags and indicators which automatically provide the transaction information to the money transfer service to extract and stage the new money transfer transaction.

6. The method of claim 5 wherein the one or more tags include one or more hashtag messages posted to a social media site which call out the money transfer service and provide the transaction information.

7. An apparatus configured for implementing financial transactions, the apparatus comprising:

an agent computer having at least one processor and memory coupled to the at least one processor, wherein the at least one processor is configured to:
- establish a relationship between a receiving party and a money transfer service, said establishing includes obtaining account access of one or more social media account of the receiving party;
- associate the one or more social media account of the receiving party with activities implemented by the money transfer service, wherein said activities comprise:
  - monitoring social media interactions of the receiving party, wherein the monitored social media interactions include one or more message posted on one or more social media stream of the one or more social media account of the receiving party;
  - identifying, based on the monitored social media interactions of the receiving party, a transactional message from the one or more message posted on the one or more social media stream of the one or more social media account of the receiving party, wherein the transactional message includes transaction information descriptive of a new money transfer transaction;
  - extracting the transaction information from the identified transactional message;
  - staging, based on the extracted transaction information, the new money transfer transaction to transfer funds to the receiving party, wherein the staged money transfer transaction is configured to be paid out to the receiving party and funded by one or more sending party accessing the staged money transfer transaction and money transfer service via the one or more social media stream;
  - creating a webpage configured to provide access to the staged money transfer transaction;
  - providing one or more notification to a social media server corresponding to the receiving party's activities undertaken with the money transfer service, wherein said providing the one or more notification comprises:
    - determining, based on the money transfer service's access to the one or more social media account of the receiving party, if the one or more social media stream of the one or more social media account of the receiving party is public;
    - posting, based on the determined public availability, a link corresponding to the created webpage configured to provide access to the staged money transfer transaction on the one or more social media stream of the one or more social media account of the receiving party, wherein the posted link is accessible to the one or more sending party; and
    - directing, based on the posted link, the one or more sending party to the created webpage associated with the staged money transfer transaction, wherein the one or more sending party interacts with the webpage using a process implemented by the money transfer service to fund the staged money transfer transaction; and
  - receiving, by the at least one processing device, funds from the one or more sending party corresponding to the staged money transfer transaction.

8. The apparatus of claim 7 wherein the process implemented by the money transfer service allows for a pre-determined maximum amount of funds to be provided by each of the one or more sending party.

9. The apparatus of claim 7 wherein the process implemented by the money transfer service corresponds to funding the money transfer transaction that has been established by a billing party.

10. The apparatus of claim 7 wherein the one or more notification includes a reminder to send a money transfer and the link corresponds to a pre-established money transfer transaction.

11. The apparatus of claim 7 wherein the one or more notification provides one or more details to the receiving party corresponding to the staged money transfer transaction that has been created and funded to provide funds to the receiving party.

12. The apparatus of claim 7 wherein the one or more notification is generated in response to a social media network user posting the transactional message, wherein the transactional message has one or more tags and indicators which automatically provide the transaction information to the money transfer service to extract and stage the new money transfer transaction.

13. The apparatus of claim 12 wherein the tags include one or more hashtag messages posted to a social media site which call out the money transfer service and provide the transaction information.

14. The method of claim 1 wherein the posted link is configured with less private information when the one or more social media stream is public.

15. The method of claim 1 wherein the posted link to the created webpage associated with the staged money transfer transaction is configured to expire after a predetermined time.

16. The method of claim 15 wherein the predetermined time is when the staged money transfer transaction is fully funded.

* * * * *